US008698731B2

(12) United States Patent
Lin et al.

(10) Patent No.: US 8,698,731 B2
(45) Date of Patent: Apr. 15, 2014

(54) BACKLIGHT MODULE DRIVING SYSTEM AND DRIVING METHOD THEREOF

(75) Inventors: Shin-Chang Lin, Taipei County (TW); Bi-Hsien Chen, Taipei County (TW); Chun-Chieh Chiu, Taoyuan County (TW); Chien-Yang Chen, Taipei (TW); Tien Yung Huang, Pingtung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 396 days.

(21) Appl. No.: 13/102,441

(22) Filed: May 6, 2011

(65) Prior Publication Data

US 2012/0127212 A1 May 24, 2012

(30) Foreign Application Priority Data

Nov. 19, 2010 (TW) ................................ 99139929 A

(51) Int. Cl.
*G09G 3/36* (2006.01)
*H04N 13/04* (2006.01)
*G06T 15/00* (2011.01)

(52) U.S. Cl.
USPC ................ 345/102; 345/419; 348/53; 349/15

(58) Field of Classification Search
USPC ......... 345/87, 102, 419; 349/13, 15; 359/466; 362/97.1; 713/320, 324, 500; 348/53
See application file for complete search history.

(56) References Cited

U.S. PATENT DOCUMENTS

2002/0109658 A1 8/2002 Noguchi
2007/0229447 A1* 10/2007 Takahara et al. .............. 345/102
2007/0242068 A1* 10/2007 Han et al. ...................... 345/427
2008/0303963 A1* 12/2008 Jung et al. ........................ 349/13
2010/0006820 A1* 1/2010 Park et al. ........................ 257/14

FOREIGN PATENT DOCUMENTS

TW I282956 10/2006

* cited by examiner

*Primary Examiner* — Quan-Zhen Wang
*Assistant Examiner* — Michael J Eurice
(74) *Attorney, Agent, or Firm* — WPAT, PC; Justin King

(57) ABSTRACT

A backlight module driving system and a driving method thereof are applied to a Liquid Crystal Display (LCD). In the LCD, a timing controller obtains a three-dimensional (3D) image signal provided by a graphics processor, generates a Liquid Crystal (LC) driving control signal, and generates a corresponding light adjusting signal according to a data writing time and a Vertical Blanking Interval (VBI) time of the LC driving control signal. A backlight driver obtains and analyzes the light adjusting signal, so as to disable a backlight module during the data writing time, and enable the backlight module during the VBI time.

8 Claims, 8 Drawing Sheets

BACKLIGHT MODULE DRIVING SYSTEM AND DRIVING METHOD THEREOF

CROSS-REFERENCE TO RELATED APPLICATION

This application claims the benefit of Taiwan Patent Application No. 099139929, filed on Nov. 19, 2010, which is hereby incorporated by reference for all purposes as if fully set forth herein.

BACKGROUND OF THE INVENTION

1. Field of Invention

The present invention relates to a backlight system of a Liquid Crystal Display (LCD), and more particularly to a backlight module driving system and a driving method thereof.

2. Related Art

FIG. 1 is a schematic system driving timing diagram of three-dimensional (3D) image shutter glasses of the prior art. In the prior art, a 3D image display technology includes a glasses-based technology. In a shutter-based 3D image technology, a 3D image effect is achieved mainly by increasing a high update frequency (higher than 120 Hz/screen) of a screen, which is an active 3D image technology. After a 3D image signal is provided for a display, a screen with an update frequency being 120 Hz presents a left-eye screen and a right-eye screen generated alternately in a screen sequence format. The alternation of the screens of the display should be synchronized with the operating of shutter glasses. That is to say, when the display displays the left-eye screen, the shutter glasses only enables a left-eye lens, and when the display displays the right-eye screen, the shutter glasses only enables a right-eye lens. Thus, a left eye of a viewer can only see the left-eye screen, and a right eye of a viewer can only see the right eye screen. The different screens seen by the two eyes of the viewer cause an illusion in the brain of the viewer due to a vision persistence effect of human eyes, and therefore the viewer can see a 3D image.

As shown in FIG. 1, after screen data of a 3D image signal is written from a first scan line to a last scan line (for example the $1080^{th}$ line) in an order, a timing controller of the display does not write the data during a Vertical Blanking Interval (VBI) time, and at the moment the left-eye lens or the right-eye lens of the shutter glasses is enabled.

However, the screen data to be seen by the left-eye or the right-eye is written into a pixel unit of the display during the writing of the data. Since in fact, the backlight module continues acting during the writing of the data, and the shutter glasses are in a disabled state during the writing of the data, both the shutter glasses and the display do not present changes of the image into which the screen data is written. Therefore, the backlight module is in a useless power consumption state during most of the time, thus resulting in gratuitous waste of energy, increasing power consumption of an LCD panel, making a result of comparison between operating efficiency of the LCD panel, a life of a component, and actually consumed energy uneconomical, and increasing unnecessary power consumption cost.

Therefore, how to decrease power consumption of a display when the display presents a 3D image becomes a problem manufactures should contemplate.

SUMMARY OF THE INVENTION

The objective of the present invention is to provide a backlight system and a light source providing method, so as to decrease power consumption of a display by adjusting luminance of a backlight module during operation of presenting a 3D image.

Accordingly, the present invention is directed to a backlight module driving system, which is applied to an LCD. The system comprises a graphics processor, a timing controller, a backlight module, and a backlight driver.

The graphics processor is used to provide a 3D image signal. The timing controller is connected to the graphics processor, and is used to generate a Liquid Crystal (LC) driving control signal according to the 3D image signal, and generate a corresponding light adjusting signal according to a data writing time and a VBI time of the LC driving control signal. The backlight driver is connected to the backlight module and the timing controller, and is used to receive and analyze the light adjusting signal, so as to disable the backlight module during the data writing time and enable the backlight module during the VBI time.

Accordingly, the present invention provides a backlight module driving method, which is applied to an LCD. The method comprises the following steps. A timing controller generates an LC driving control signal according to a 3D image signal provided by a graphics processor, and generates a light adjusting signal according to a data writing time and a VBI time of the LC driving control signal. A backlight driver analyzes the light adjusting signal, so as to disable the backlight module during the data writing time and enable the backlight module during the VBI time.

Characteristics of the present invention are as follows. In the present invention, when a 3D image signal is displayed, a backlight module is controlled by a backlight driver to switch luminance. During data writing, the backlight module is disabled, or the luminance is decreased; and during a VBI, the backlight module is enabled, or the luminance is increased; so as to reduce actual power consumption and improve image quality when an LCD presents a 3D image screen, thus requiring less electricity and lower power consumption than that in the prior art. Therefore, the consumed power of an LCD panel is effectively decreased, life of components is elongated, actual energy consumption is decreased, and unnecessary power consumption cost is avoid.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described below in detail with reference to the accompanying drawings.

Figure 1:
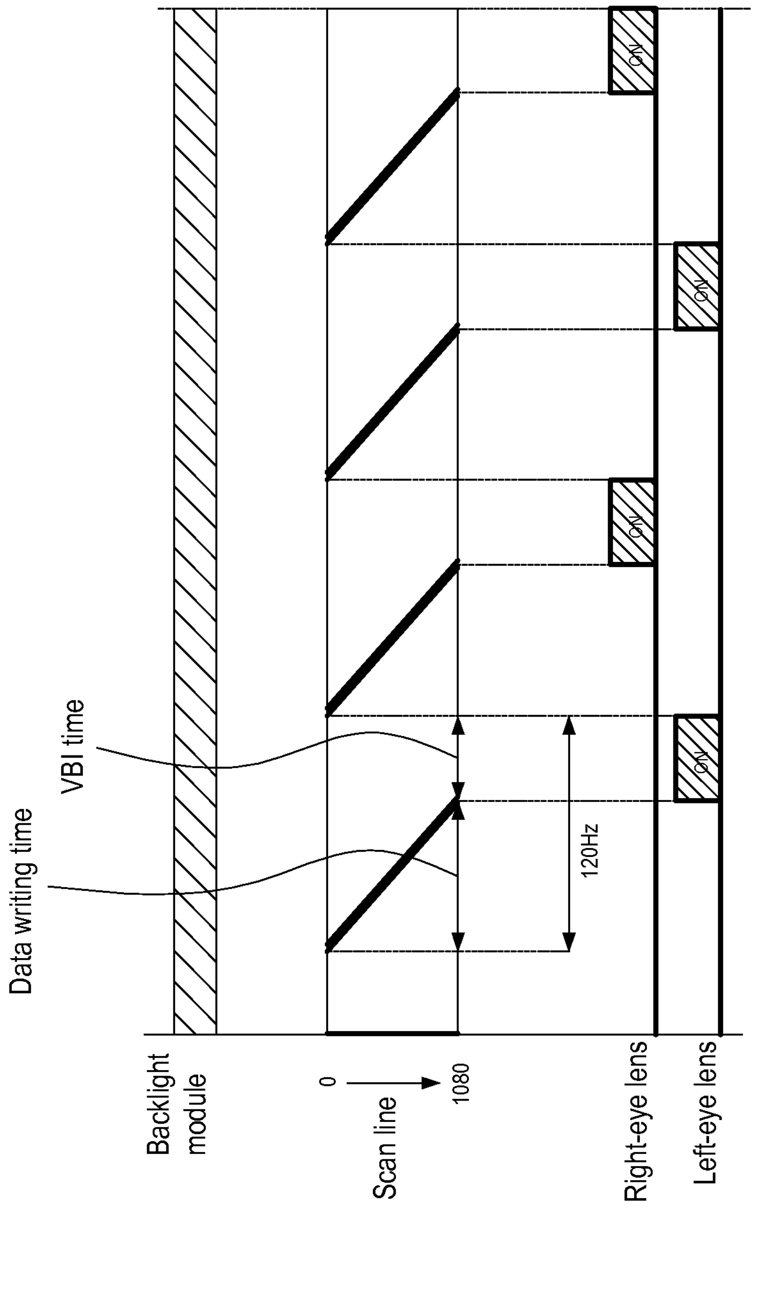
FIG. 1 (Prior art)
FIG. 1 is a schematic system driving timing diagram of 3D image shutter glasses of the prior art.
Figure 2A:
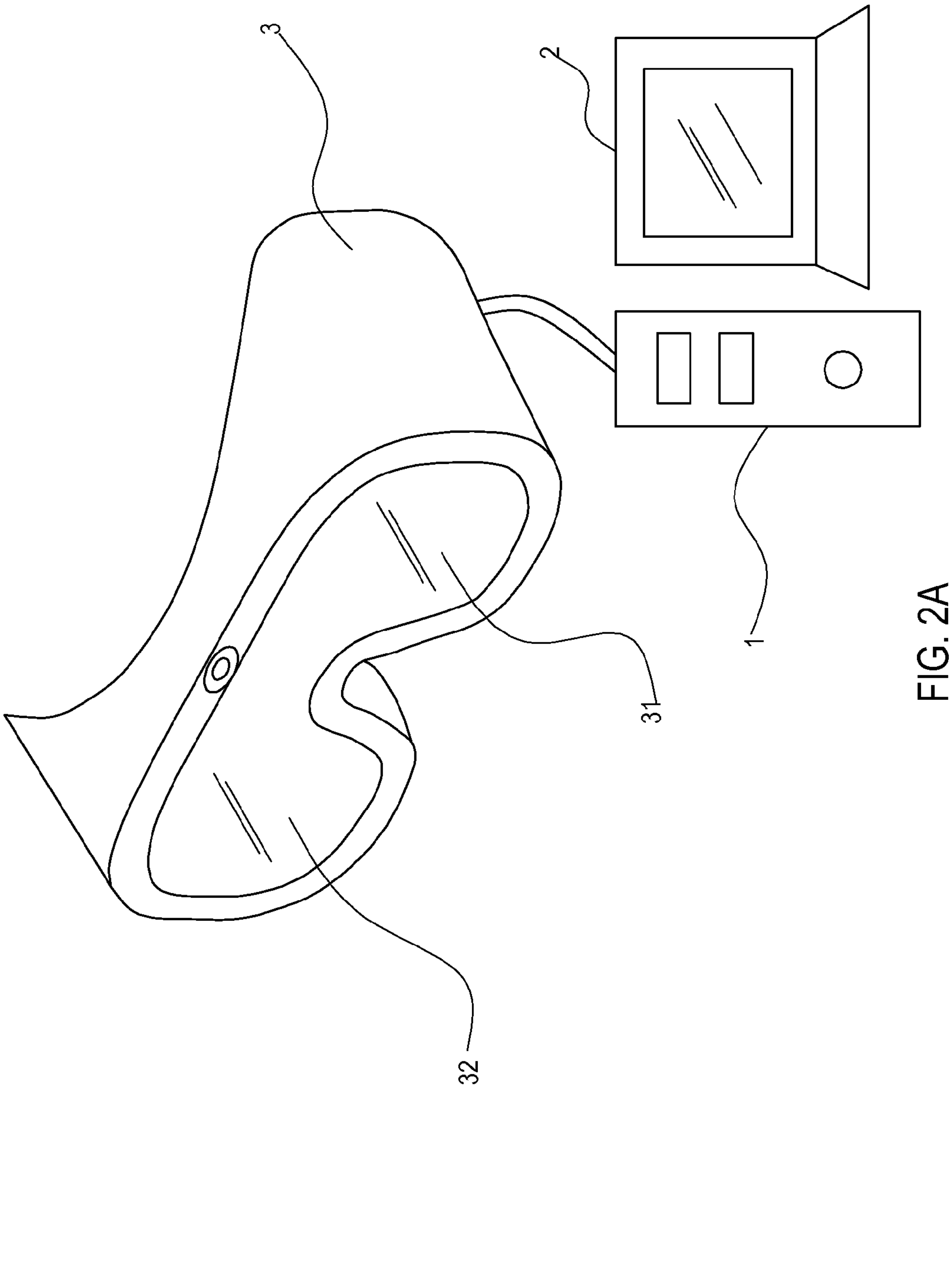
FIG. 2A is a schematic view of a first equipment architecture of a backlight module driving system according to an embodiment of the present invention.
Figure 2B:
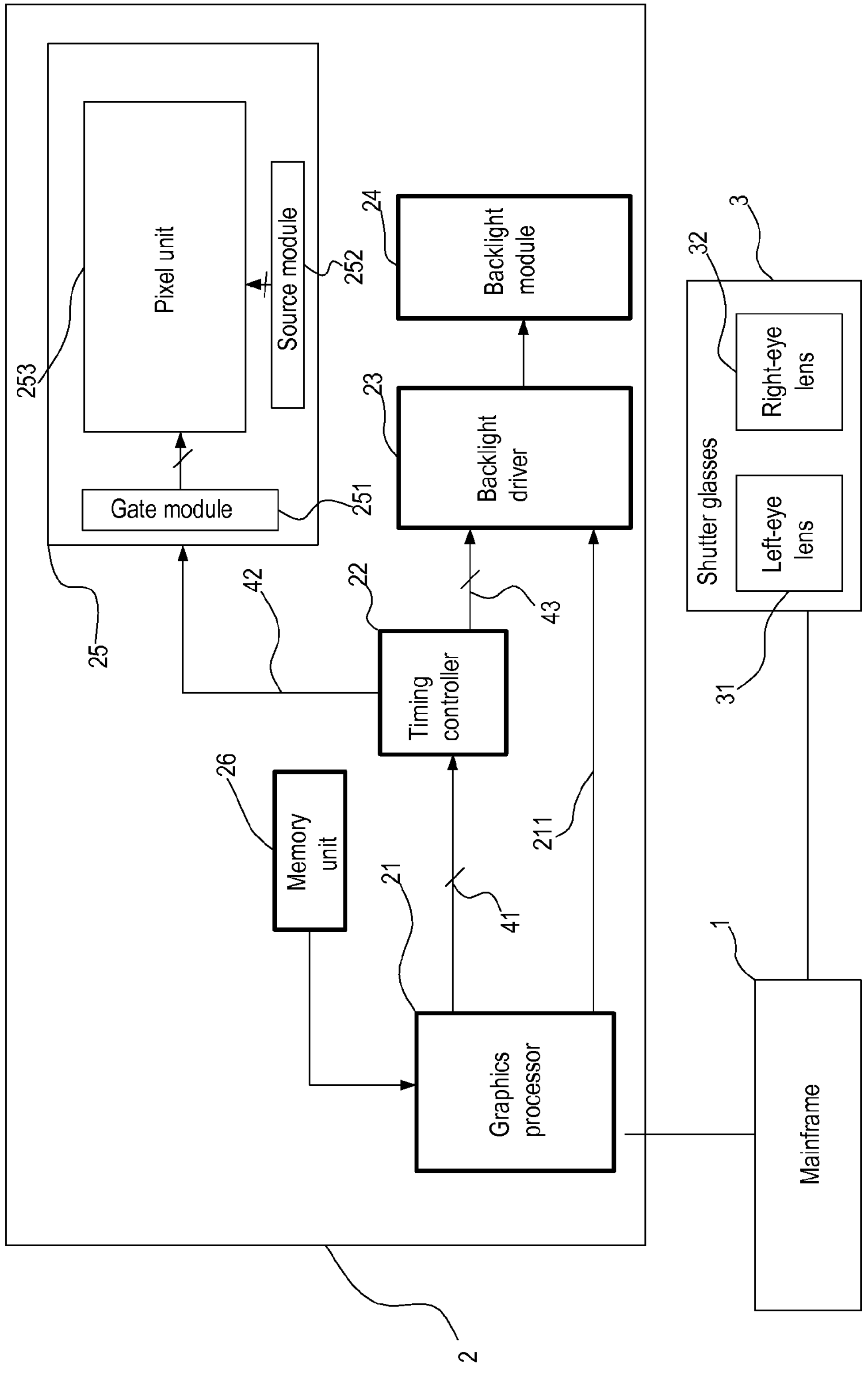
FIG. 2B is a schematic view of the first equipment architecture of the backlight module driving system according to the embodiment of the present invention.
Figure 3:
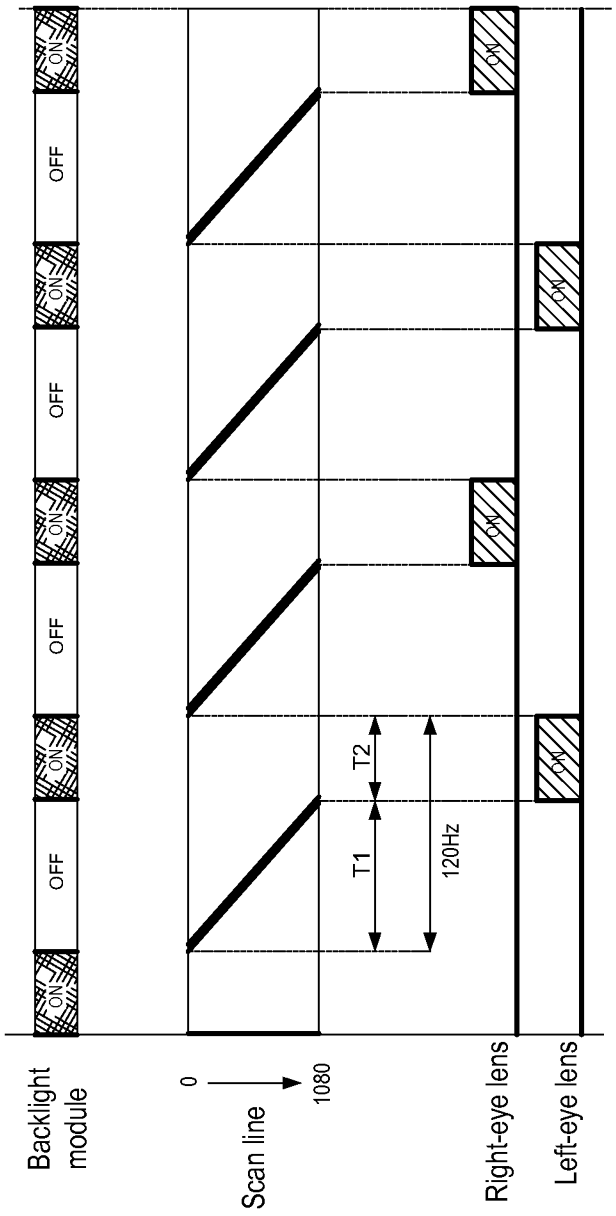
FIG. 3 is a schematic operating timing diagram of a backlight system according to an embodiment of the present invention.

Referring to FIG. 2A, a schematic view of a first equipment architecture of a backlight module driving system according to an embodiment of the present invention is shown. Referring to FIG. 2B, a schematic view of the first equipment architecture of the backlight module driving system according to the embodiment of the present invention is shown. Referring to FIG. 3, a schematic operating timing diagram of a backlight system according to the embodiment of the present invention is shown. As shown in FIG. 2A, a mainframe 1 is connected to an LCD 2. The mainframe 1 is connected to shutter glasses 3 in a wired or wireless manner. The shutter glasses 3 include a left-eye lens 31 and a right-eye lens 32. The mainframe 1 is used to control the LCD 2 and the shutter glasses 3 to perform an image synchronous operation for displaying images. A technology of operation of the shutter glasses 3 is familiar to persons skilled in the same art, and only interaction between the shutter glasses 3 and a driving system of a backlight module 24 is illustrated herein.

As shown in FIG. 2B, the system is applied to the above LCD 2, and includes a graphics processor 21, a timing controller 22, the backlight module 24, and a backlight driver 23. The timing controller 22 is further connected to an LCD panel 25 of the LCD 2 to control a gate module 251 of the LCD panel 25 to perform scan control on a pixel unit 253, and control a source module 252 to perform screen information writing control on the pixel unit 253.

The graphics processor 21 is used to provide a 3D image signal 41 for the timing controller 22 continuously. The timing controller 22 generates an LC driving control signal 42 according to the 3D image signal 41 that controls action of the LCD panel 25 and includes a scan signal and a screen data writing signal. The timing controller 22 further generates a corresponding light adjusting signal 43 according to a data writing time and a VBI time of the LC driving control signal 42, and the light adjusting signal 43 includes control information and configurations for controlling the backlight driver 23.

When or before transmitting the 3D image signal 41, the graphics processor 21 firstly enables the backlight driver 23 (that is, a backlight enabling line 211 is used to transmit a backlight enabling signal) to make the backlight driver 23 be in a standby state. When being enabled, the backlight driver 23 also firstly provides power for the backlight module 24 to make the backlight module 24 be in a standby state.

As shown in FIG. 3, the timing controller 22 outputs the LC driving control signal 42 to the LCD panel 25 to perform screen scan update and write data into the pixel unit 253. The screen data included in the 3D image signal 41 is written into each of the pixel units 253 one by one from a first scan line to a last scan line (which is assumed herein to be the 1080$^{th}$ scan line).

As stated above, the timing controller 22 provides the light adjusting signal 43 for the backlight driver 23. After analyzing the light adjusting signal 43, the backlight driver 23 disables the backlight module 24 during a data writing time T1. It should be noted herein that the disabling the backlight module 24 refers to adjusting the luminance of light emitted by the backlight module 24, so that the luminance of the light source is adjusted to a minimum value, and power to the backlight module 24 is switched. Additionally, a VBI T2 follows the data writing time T1, and during the VBI T2 the timing controller 22 does not performs any action of screen update or writing. In this case, the backlight driver 23 enables the backlight module 24 during the VBI T2. It should be noted that, the enabling the backlight module 24 refers to adjusting the luminance of the light emitted by the backlight module 24, so that the luminance of the light source is adjusted to the original luminance before the backlight module 24 is disabled, preset luminance, or a highest value of the luminance.

According to FIG. 2A and FIG. 3, the mainframe 1 is used to synchronize the screens of the LCD 2 and the shutter glasses 3, so that the shutter glasses 3 enables the left-eye lens 31 during a VBI time, enables the right-eye lens 32 during a next VBI time, and enables the left-eye lens 31 during another next VBI time, which is repeated. The left-eye lens 31 of the shutter glasses 3 receives a left-eye screen displayed by the LCD 2, and the right-eye lens 32 of the shutter glasses 3 receives a right-eye screen displayed by the LCD 2. During each data writing time T1, the backlight driver 23 disables the backlight module 24 to reduce power consumption of the backlight module 24. The mainframe 1 also controls the shutter glasses 3 to disable the right-eye lens 32 and the left-eye lens 31 during the data writing time T1.

As shown in FIG. 3, the 3D image signal 41 includes an update frequency of the screen, and the update frequency is at least higher than 120 Hz/screen.

Figure 4:
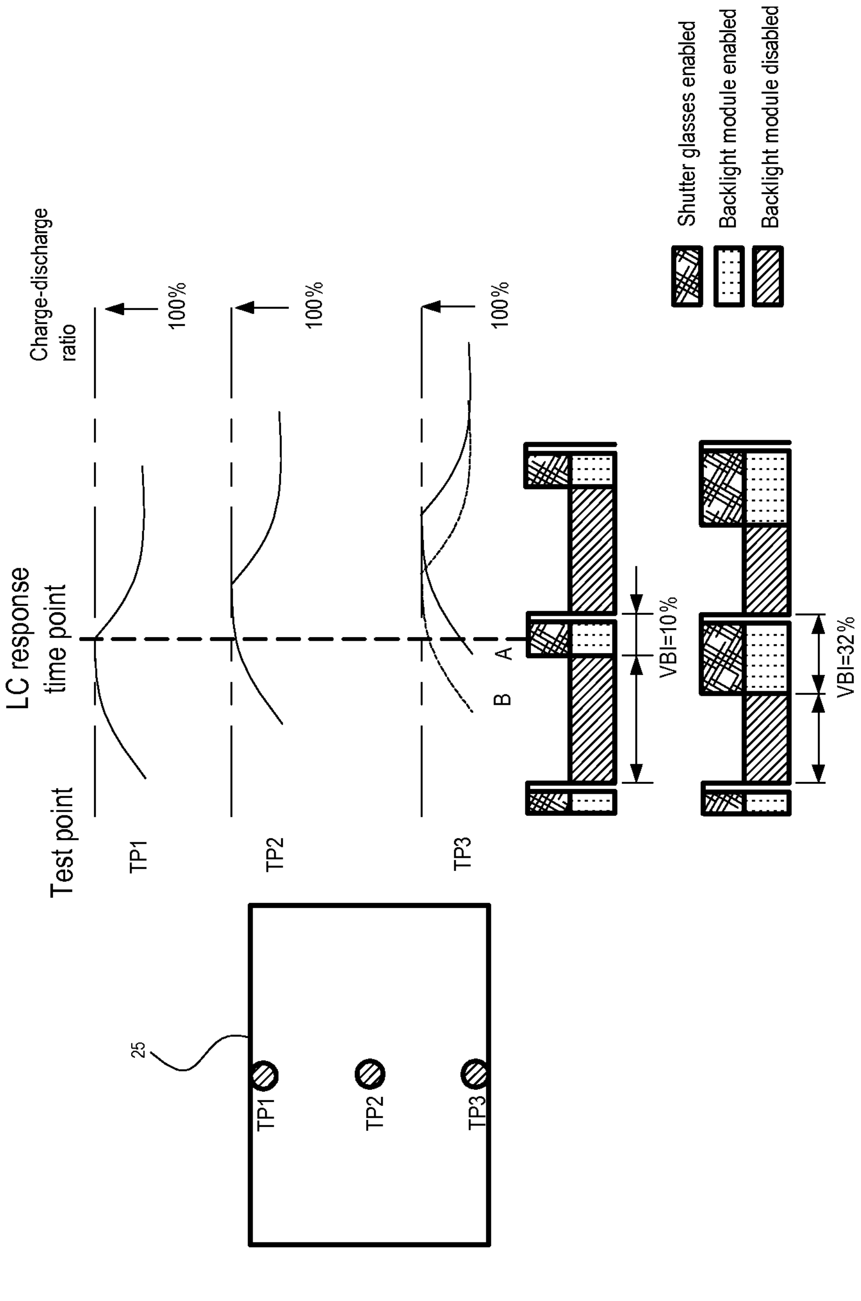
FIG. 4 is a schematic LC response timing diagram according to an embodiment of the present invention.

Referring to FIG. 4, a schematic LC response timing diagram according to the embodiment of the present invention is shown, and FIG. 3 and FIG. 2B facilitate understanding.

Many pixel units 253 arranged in intersecting columns and rows are disposed on the LCD panel 25. Herein from top to bottom, three test points are set, which are a first test point TP1, a second test point TP2, and a third test point TP3. According to FIG. 4, the first test point TP1 best meets requirements of an LC writing and discharge response time (an LC response time point shown in the figure). When duration of the VBI is 10% of a sum of the data writing time and the VBI time (that is VBI=10%), an LC writing time point of the third test point is a point A, thus resulting in an imperfect LC response time. When the VBI T2 is greater than 30% of the sum of the data writing time T1 and the VBI T2 (for example VBI=32%), a start point of the LC writing time is moved to a point B, thus resulting in a better LC response time and a better effect of the 3D image presented by the LC, reducing a Ghost effect, increasing the luminance of the light provided by the backlight module 24, and improving quality of the image.

Figure 5:
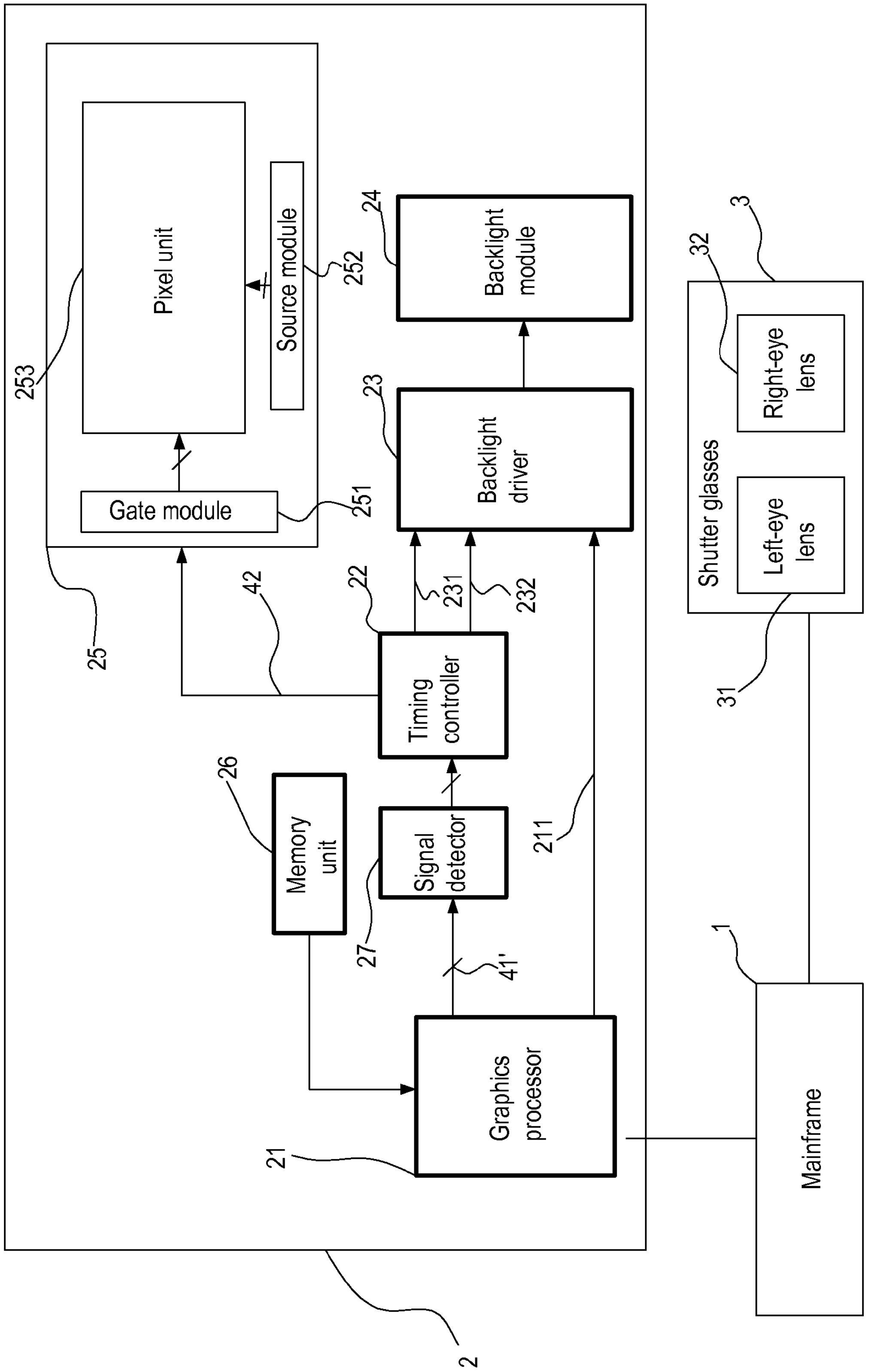
FIG. 5 is a schematic view of a second equipment architecture of the backlight module driving system according to an embodiment of the present invention.

Referring to FIG. 5, a schematic view of a second equipment architecture of the driving system of the backlight module 24 according to an embodiment of the present invention is shown, and a difference between FIG. 5 and FIG. 2 is that, the system in this embodiment further includes a signal detector 27, and a timing controller 22 and a backlight driver 23 further include a mode switching circuitry 231 and a pulse-width light adjusting circuitry 232.

A graphics processor 21 is used to provide a source image signal 41', which may be a 2 dimensional (2D) image signal or a 3D image signal 41. When the signal detector 27 obtains the source image signal 41', the signal detector 27 analyzes signal data included in the source image signal 41', and calculates a time ratio of a VBI time to a sum of a data writing time and the VBI time, that is 100%×the VBI time/(the data writing time+the VBI time), which is a VBI value.

A judging value is stored in the signal detector 27. When the signal detector 27 judges that the above VBI value is greater than the judging value, the signal detector 27 produces a signal testing result indicating that the source image signal 41' is the 3D image signal 41, and transmits the signal testing result together with the 3D image signal 41 to the timing controller 22.

The timing controller 22 may adjust the data writing time and the VBI time of an LC driving control signal 42 to comply with an LC driving mode in which an LCD panel 25 displays the 3D image signal 41. Then, the timing controller 22 enables a backlight processing mode of the 3D image signal 41 of the backlight driver 23 through the mode switching circuit 231, and provides the above light adjusting signal 43 for the backlight driver 23 through the pulse-width light adjusting circuitry 232, so that the backlight driver 23 switches luminance of the backlight module 24 according to the data writing time and the VBI time.

When the signal detector 27 judges that the above VBI value is not greater than a judging value, the signal detector 27 produces a signal testing result indicating that the source image signal 41' is a 2D image signal, and transmits the signal testing result together with the 2D image signal to the timing controller 22.

The timing controller 22 may adjust the data writing time and the VBI time of the LC driving control signal 42 to comply with an LC driving mode in which the LCD panel 25 displays the 2D image signal. Then, the timing controller 22 enables a backlight processing mode of the 2D image signal of the backlight driver 23 through the mode switching circuit 231, and controls the backlight driver 23 to make the backlight module 24 emit light continuously.

The judging value used by the signal detector 27 is a specific value between VBI=32% (which is used for a 3D image) and VBI=10% (which is used for a 2D image), for example VBI=20%, but the present invention is not limited thereto, and values such as 15%, 25%, and 22% are all applicable. However, an update frequency of the 2D image signal is at least 60 Hz/screen or above, and the timing controller 22 enables the LCD panel 25 to display the screen according to the update frequency.

In addition, specification information of an LCD 2, such as resolution of the LCD 2, a scan frequency to be used for displaying a 2D image or a 3D image, is recorded in a memory unit 26. When the graphics processor 21 obtains a source image medium provided by a mainframe 1, the graphics processor 21 forms the 2D image signal or the 3D image signal 41 according to the above specification information. In addition, the judging value used by the signal detector 27 may also be recorded in the memory unit 26, and the judging value may be transferred to the signal detector 27 by the graphics processor 21.

Additionally, the backlight module 24 performs light switching between bright to dark repeatedly in a high speed, the time during which the backlight module 24 emits the light is very short, and a left-eye lens 31 and a right-eye lens 32 of shutter glasses 3 are enabled and disabled repeatedly, so that eyes of a user are blocked intermittently, and the eyes of the user cannot receive enough light in time, which makes the luminance of screen viewed by the user lower than the actual luminance of the screen. Therefore, when the graphics processor 21 provides the 3D image signal 41, the backlight driver 23 operates in the backlight processing mode of the 3D image signal 41, the backlight driver 23 provides high power for drive the backlight module 24, so as to increase the luminance of the backlight module 24 at the moment being enabled. So that with the eyes of the user being affected by the intermittent blocking and the high luminance of the light provided by the backlight module 24, the user can view the screen with suitable luminance. When the graphics processor 21 provides the 2D image signal, the backlight driver 23 operates in a backlight processing mode of the 2D image signal. That is to say, the backlight module 24 does not need to perform luminance switching, so that the backlight driver 23 only needs to provide preset operating power for drive the backlight module 24 normally.

Figure 6:
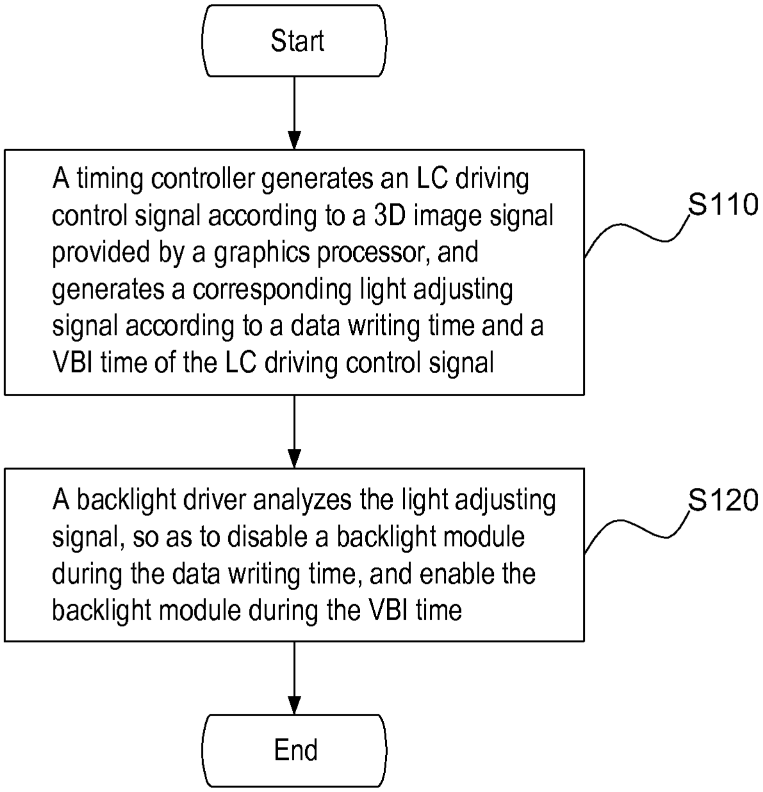
FIG. 6 is a schematic flow chart of a backlight module driving method according to an embodiment of the present invention.

Referring to FIG. 6, a schematic flow chart of a backlight module driving method according to an embodiment of the present invention is shown, and FIG. 2A, FIG. 2B, and FIG. 3 facilitate understanding. The method for driving a backlight module 24 includes the following steps.

A timing controller generates an LC driving control signal according to a 3D image signal provided by a graphics processor, and generates a corresponding light adjusting signal according to a data writing time and a VBI time of the LC driving control signal (Step S110).

A backlight driver analyzes the light adjusting signal, so as to disable a backlight module during the data writing time, and enable the backlight module during the VBI time (Step S120).

Figure 7:
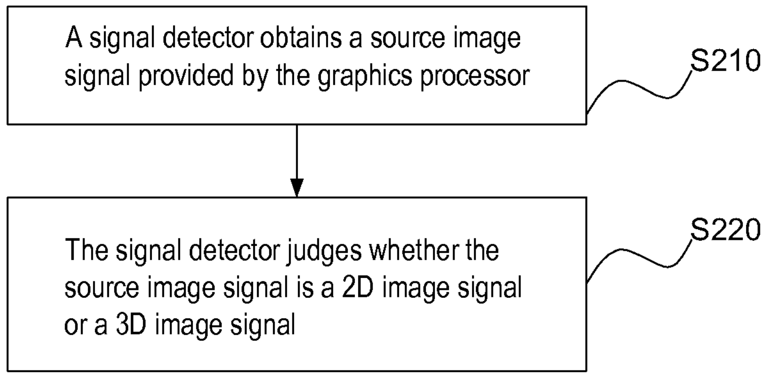
FIG. 7 is a schematic flow chart of signal detecting in a backlight module driving method according to an embodiment of the present invention.
Figure 8:
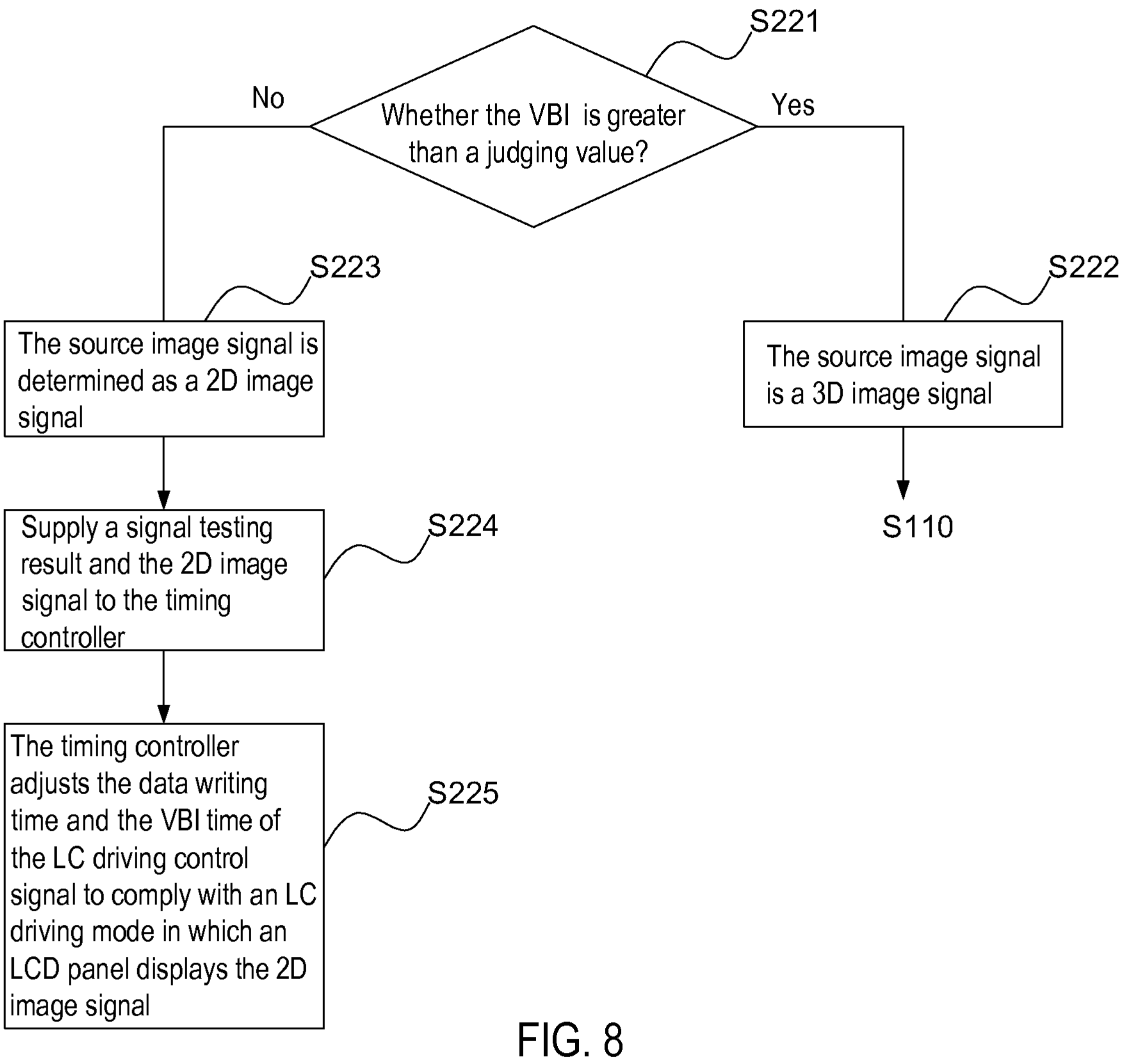
FIG. 8 is a detailed flow chart of a signal detecting method according to an embodiment of the present invention.

Referring to FIG. 7, a schematic flow chart of signal detecting in the backlight module driving method according to the embodiment of the present invention is shown. Referring to FIG. 8, a detailed flow chart of the signal detecting method according to the embodiment of the present invention is shown. FIG. 5 facilitates understanding. The method includes the following steps.

A signal detector obtains a source image signal provided by the graphics processor (Step S210).

The signal detector judges whether the source image signal is a 2D image signal or a 3D image signal (Step S220). In a detailed process of the step shown in FIG. 8, the signal detector 27 judges whether a time ratio of the VBI time to a sum of the data writing time and the VBI time corresponding to the source image signal 41' is greater than a judging value (Step S221).

When it is judged that the time ratio of the VBI time to the sum of the data writing time and the VBI time corresponding to the source image signal 41' is greater than the judging value, it is determined that the source image signal is a 3D image signal (Step S222).

When the signal detector 27 judges that the above VBI value is greater than the judging value, the signal detector 27 produces a signal testing result indicating that the source image signal 41' is a 3D image signal 41, and transmits the signal testing result together with the 3D image signal 41 to the timing controller 22. Then, the procedure proceeds to Step S110.

When it is judged that the time ratio of the VBI time to the sum of the data writing time and the VBI time corresponding to the source image signal 41' is smaller than the judging value, it is determined that the source image signal is a 2D image signal (Step S223).

When the source image signal 41' is the 2D image signal, the signal detector 27 provides the signal testing result and the 2D image signal for the timing controller (Step S224).

The timing controller adjusts the data writing time and the VBI time of the LC driving control signal to comply with an LC driving mode in which an LCD panel displays the 2D image signal (Step S225).

In view of the above, implementation or embodiments of the technical solutions presented by the present invention to solve problems are described herein, which is not intended to limit the scope of implementation of the present invention.

Equivalent modification and improvement in accordance with the claims of the present invention or made according to the claims of the present invention is covered by the claims of the present invention.

What is claimed is:

1. A backlight module driving system, applied to a Liquid Crystal Display (LCD), comprising:

a graphics processor, for providing a three-dimensional (3D) image signal;

a timing controller, for generating a Liquid Crystal (LC) driving control signal according to the 3D image signal, and generating a corresponding light adjusting signal according to a data writing time and a Vertical Blanking Interval (VBI) time of the LC driving control signal;

a backlight module;

a backlight driver, for receiving the light adjusting signal, and analyzing the light adjusting signal, so as to disable the backlight module during the data writing time, and enable the backlight module during the VBI time; and a signal detector connected to the graphics processor, wherein the graphics processor further provides a two-dimensional (2D) image signal, when the signal detector judges that the 2D image signal is obtained, the signal detector provides a signal testing result and the 2D image signal to the timing controller, the timing controller adjusts the data writing time and the VBI time of the LC driving control signal according to the signal testing result to comply with an LC driving mode in which an LCD panel displays the 2D image signal, and controls the backlight driver to make the backlight emit light continuously;

wherein a judging value is stored in the signal detector, when the signal detector obtains a source image signal, and judges that a time ratio of the VBI time to the sum of the data writing time and the VBI time corresponding to the source image signal is greater than the judging value, the signal detector determines the source image signal as a 3D image signal, and when the signal detector judges that the time ratio of the VBI time to the sum of the data writing time and the VBI time corresponding to the source image signal is smaller than the judging value, the signal detector determines the source image signal as a 2D image signal.

2. The backlight module driving system according to claim 1, wherein when the backlight driver disables the backlight module, the backlight driver adjusts luminance of a light source of the backlight module to a lowest value.

3. The backlight module driving system according to claim 1, wherein when the backlight driver enables the backlight module, the backlight driver adjusts luminance of a light source of the backlight module to the original luminance before the disabling, or adjusts the luminance of the light source to a highest value.

4. The backlight module driving system according to claim 1, further comprising shutter glasses, wherein the shutter glasses enables a left-eye lens during the VBI time, and enables a right-eye lens during a next VBI time.

5. The backlight module driving system according to claim 1, wherein the VBI time is greater than 30% of a sum of the data writing time and the VBI time.

6. The backlight module driving system according to claim 1, wherein when the graphics processor provides the 3D image signal, the backlight driver provides high power to drive the backlight module, and when the graphics processor provides the 2D image signal, the backlight driver provides preset operating power to drive the backlight module.

7. The backlight module driving system according to claim 1, further comprising a memory unit, for recording specification information, so that the graphics processor forms the 2D image signal and the 3D image signal according to the specification information.

8. A backlight module driving method, applied to a Liquid Crystal Display (LCD), comprising:

a timing controller generating a Liquid Crystal (LC) driving control signal according to a three-dimensional (3D) image signal provided by a graphics processor, and generating a corresponding light adjusting signal according to a data writing time and a Vertical Blanking Interval (VBI) time of the LC driving control signal; and a backlight driver analyzing the light adjusting signal, disabling a backlight module during the data writing time, and enabling the backlight module during the VBI time;

a signal detector obtaining a source image signal provided by the graphics processor;

the signal detector judging whether the source image signal is a two-dimensional (2D) image signal or the 3D image signal, wherein the step of the signal detector judging whether the source image signal is the 2D image signal or the 3D image signal further comprises:

the signal detector judging whether a time ratio of the VBI time to a sum of the data writing time and the VBI time corresponding to the source image signal is greater than a judging value;

determining the source image signal as a 3D image signal when the time ratio of the VBI time to the sum of the data writing time and the VBI time corresponding to the source image signal is greater than the judging value; and determining the source image signal as a 2D image signal when the time ratio of the VBI time to the sum of the data writing time and the VBI time corresponding to the source image signal is smaller than the judging value;

providing a signal testing result and the 2D image signal to the timing controller when the source image signal is the 2D image signal;

the timing controller adjusting the data writing time and the VBI time of the LC driving control signal to comply with an LC driving mode in which an LCD panel displays the 2D image signal; and the timing controller controlling the backlight driver to make the backlight module emit light continuously.

* * * * *